United States Patent
Janarthanan et al.

(10) Patent No.: US 8,004,976 B2
(45) Date of Patent: Aug. 23, 2011

(54) MONITORING, CONTROLLING, AND PREVENTING TRAFFIC CONGESTION BETWEEN PROCESSORS

(75) Inventors: Bhagatram Y. Janarthanan, Santa Clara, CA (US); Rafael Mantilla Montalvo, Raleigh, NC (US); Robert M. Broberg, Berwyn, PA (US); Michael S. Hanna, Raleigh, NC (US); Bhaskar Bhupalam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 11/684,676

(22) Filed: Mar. 12, 2007

(65) Prior Publication Data
US 2008/0225705 A1    Sep. 18, 2008

(51) Int. Cl.
*H04L 12/26* (2006.01)
(52) U.S. Cl. ................................. 370/230; 370/235
(58) Field of Classification Search .................. None
See application file for complete search history.

(56) References Cited

U.S. PATENT DOCUMENTS

| | | | |
|---|---|---|---|
| 5,936,958 A * | 8/1999 | Soumiya et al. | 370/395.43 |
| 6,141,323 A * | 10/2000 | Rusu et al. | 370/236 |
| 6,556,578 B1 * | 4/2003 | Silberschatz et al. | 370/412 |
| 6,765,867 B2 | 7/2004 | Shanley et al. | 370/229 |
| 6,804,194 B1 | 10/2004 | Kadambi et al. | 370/229 |
| 6,850,490 B1 | 2/2005 | Woo et al. | 370/230 |
| 6,904,047 B2 | 6/2005 | Han et al. | 370/414 |
| 6,980,516 B1 * | 12/2005 | Wibowo et al. | 370/235 |
| 6,990,095 B2 | 1/2006 | Wu et al. | 370/367 |
| 7,027,404 B2 | 4/2006 | Sreejith et al. | 370/238 |
| 7,460,874 B1 * | 12/2008 | Hou et al. | 455/466 |
| 7,675,857 B1 * | 3/2010 | Chesson | 370/235 |
| 2002/0080780 A1 * | 6/2002 | McCormick et al. | 370/355 |
| 2003/0037165 A1 * | 2/2003 | Shinomiya | 709/238 |
| 2004/0071086 A1 * | 4/2004 | Haumont et al. | 370/230 |

OTHER PUBLICATIONS

Sally Floyd and Van Jacobson, "Random Early Detection Gateways for Congestion Avoidance", IEEE/ACM Transactions on Networking, vol. 1, No. 4, Aug. 1993, pp. 397-413.*
Sally Floyd and Van Jacobson, "Random Early Detection Gateways for Congestion Avoidance", IEEE/ACM Transactions on Networking, Vo. 1, No. 4, Aug. 1993, pp. 397-413.*

* cited by examiner

*Primary Examiner* — Huy D Vu
*Assistant Examiner* — Maria L Sekul
(74) *Attorney, Agent, or Firm* — Baker Botts L.L.P.

(57) ABSTRACT

A system for monitoring congestion at processors includes queues and a congestion monitor. The queues receive packets, and each queue is associated with a processor. For each queue, the congestion monitor establishes whether a time-averaged occupancy of a queue exceeds a time-averaged occupancy threshold. The congestion monitor provides a notification if the time-averaged occupancy exceeds the time-averaged occupancy threshold.

20 Claims, 3 Drawing Sheets

MONITORING, CONTROLLING, AND PREVENTING TRAFFIC CONGESTION BETWEEN PROCESSORS

TECHNICAL FIELD

This invention relates generally to the field of telecommunications and more specifically to monitoring, controlling, and preventing traffic congestion between processors.

BACKGROUND

In distributed architectures, processors may communicate packets to one another through a switch. Some architectures use an N-by-(N-1) switch, which has a separate path from each processor to every other processor. Thus, congestion of one path does not affect other paths. N-by-(N-1) switches, however, are typically expensive. Moreover, processors may be added to a switch over time, creating the need for more paths at the switch.

Other architectures use a non-N-by-(N-1) switch, where processors share paths of the switch. Non-N-by-(N-1) switches, however, may experience head-of-line blocking problems. In this situation, if a processor is congested and cannot accept any more packets, packets for the processor remain in a queue that is shared by other processors. Until the waiting packets are taken from the queue by the processor, packets that arrive after the waiting packets cannot be taken by the other processors. This causes a packet buildup in the shared queue. Accordingly, congestion at the one processor may deteriorate service for other processors that share the same queue.

SUMMARY OF THE DISCLOSURE

In accordance with the present invention, disadvantages and problems associated with previous techniques for monitoring congestion at a number of processors may be reduced or eliminated.

According to one embodiment of the present invention, a system for monitoring congestion at processors includes queues and a congestion monitor. The queues receive packets, and each queue is associated with a processor. For each queue, the congestion monitor establishes whether a time-averaged occupancy of a queue exceeds a time-averaged occupancy threshold. The congestion monitor provides a notification to the processor that is sending the traffic if the time-averaged occupancy exceeds the time-averaged occupancy threshold.

Certain embodiments of the invention may provide one or more technical advantages. A technical advantage of one embodiment may be that a congestion monitor may monitor congestion at a number of processors, and may provide a notification if a processor becomes congested. In the embodiment, the congestion monitor may monitor congestion by establishing a time-averaged occupancy for queues buffering packets for the processors. If the time-averaged occupancy exceeds a time-averaged occupancy threshold, the congestion monitor may provide the notification.

Another technical advantage of one embodiment may be that the time-averaged occupancy may take into account whether the number of packets in a queue exceeds a predetermined threshold. In the embodiment, the congestion monitor determines the frequency of excess packets events at a queue, where an excess packets event occurs when the number of packets exceeds a number of packets threshold. The congestion monitor then determines whether the frequency of excess packets events exceeds a frequency threshold.

Another technical advantage of one embodiment may be that the congestion monitor may be provided at a programmable device separate from the switch. Accordingly, the switch need not be redesigned and/or upgraded. Another technical advantage of one embodiment may be that the different threshold values may be adjusted to achieve a desired amount of congestion control and/or congestion prevention.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
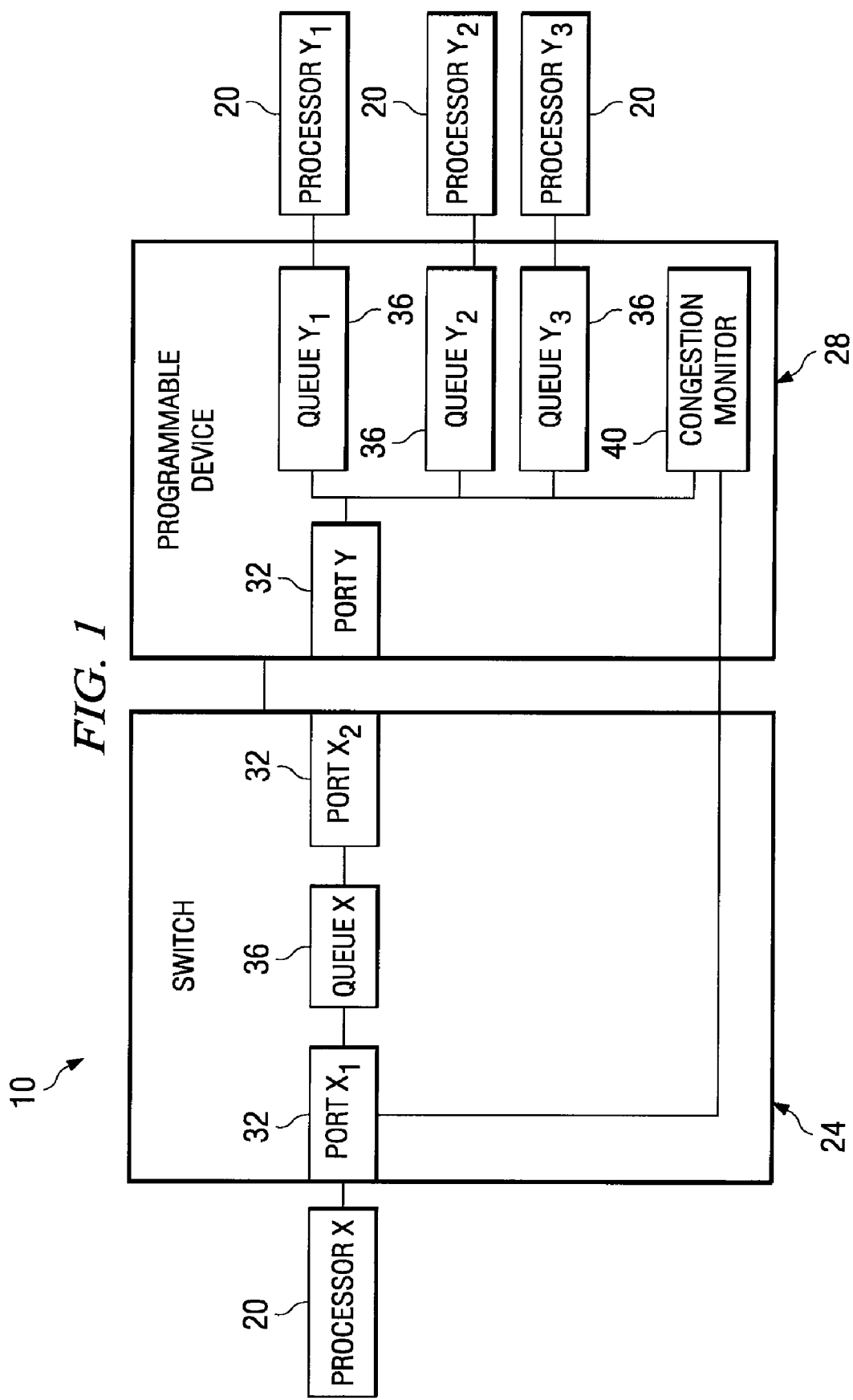
FIG. 1 illustrates one embodiment of a system that includes a congestion monitor and processors.
Figure 2:
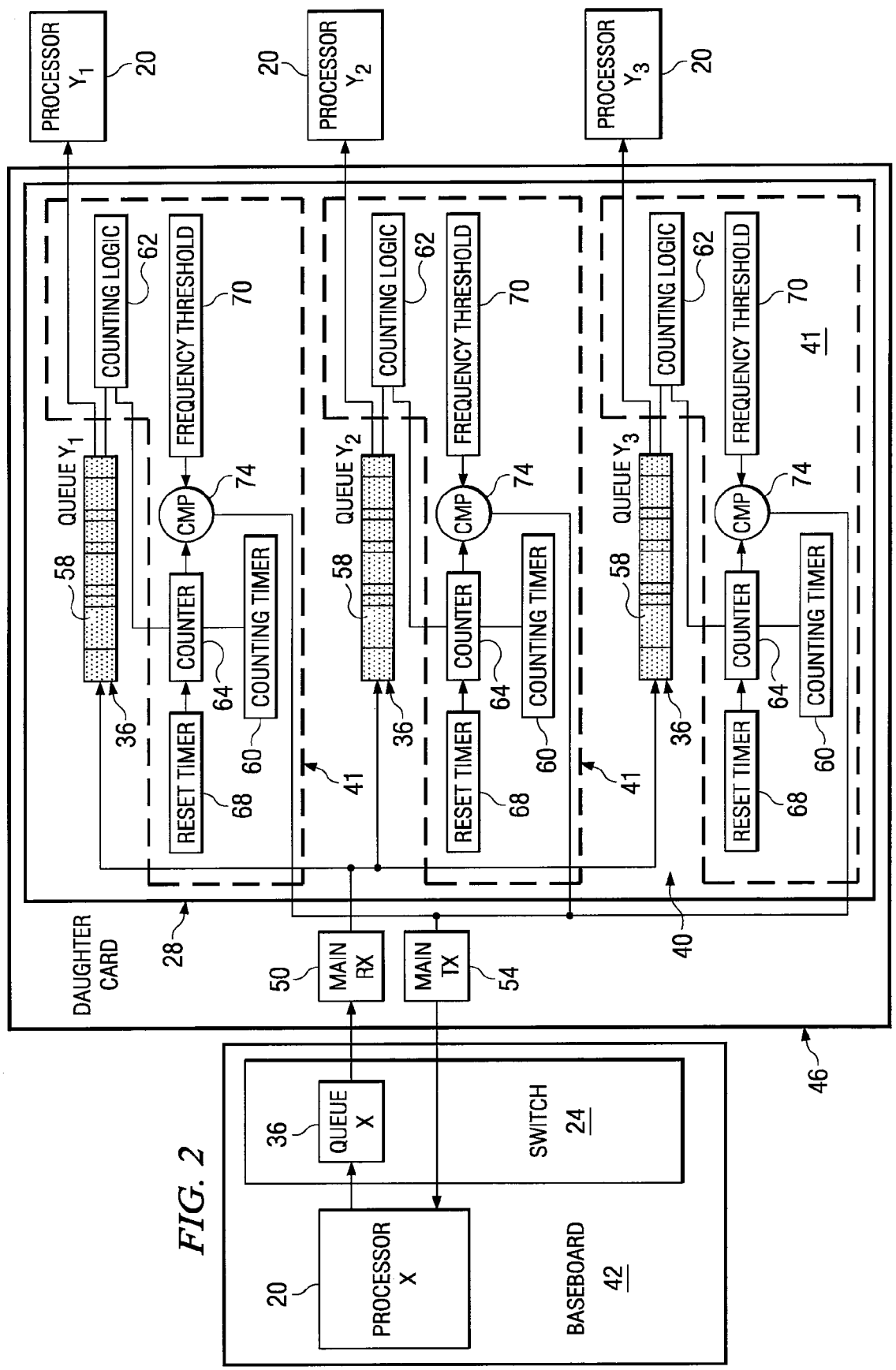
FIG. 2 illustrates embodiments of a switch and a programmable device that may be used with the system of FIG. 1.
Figure 3:
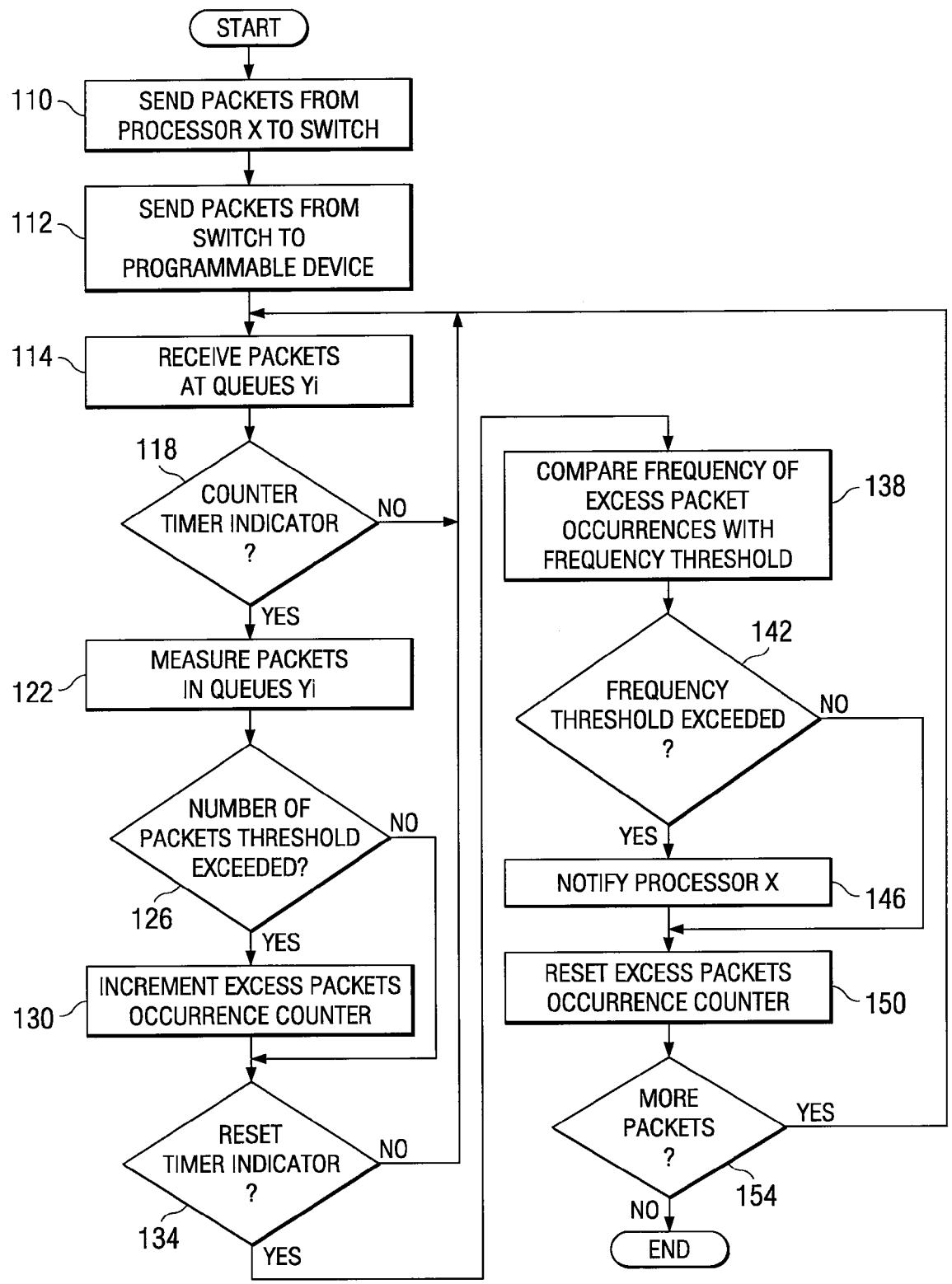
FIG. 3 illustrates one embodiment of a method for monitoring congestion at a plurality of processors that may be used by the system of FIG. 1.

Embodiments of the present invention and its advantages are best understood by referring to FIGS. 1 through 3 of the drawings, like numerals being used for like and corresponding parts of the various drawings.

FIG. 1 illustrates one embodiment of a system 10 that includes a congestion monitor 40 and processors 20. According to the embodiment, congestion monitor 40 monitors congestion at processors 20, and may provide a notification if a processor 20 becomes congested. In the embodiment, congestion monitor 40 may monitor congestion by establishing a time-averaged occupancy for queues 36 buffering packets for the processors 20. If the time-averaged occupancy exceeds a time-averaged occupancy threshold, congestion monitor 40 may provide the notification.

In one embodiment, the time-averaged occupancy may take into account whether the number of packets in a queue exceeds a predetermined threshold. Congestion monitor 40 determines the frequency of excess packets events at a queue 36, where an excess packets event occurs when the number of packets exceeds a number of packets threshold. Congestion monitor 40 then determines whether the frequency of excess packets events exceeds a frequency threshold.

According to one embodiment, system 10 communicates packets. A packet comprises a bundle of data organized in a specific way for transmission. Packets may be used to communicate information. Information may refer to voice, data, text, audio, video, multimedia, control, signaling, other information, or any combination of any of the preceding.

According to the illustrated embodiment, system 10 includes processors 20, a switch 24, and a programmable device 28 coupled as shown. Switch 24 and programmable device 28 include ports 32 and queues 36 coupled as shown. Programmable device 28 includes congestion monitor 40 coupled as shown.

In one embodiment, processors 20 perform arithmetic, logic, control, and/or other suitable processing operations. A processor 20 may represent a microprocessor, a central processing unit (CPU), or any other device operable to perform processing operations. In the illustrated embodiment, processors 20 include processors X and $Y_i$, where i=1, 2, 3. In one embodiment, processor X may adjust the flow of packets to a processor $Y_i$ in response to a notification that processor $Y_i$ is congested.

Switch 24 facilitates communication of packets between processor X and processors $Y_i$ by transmitting packets through programmable device 28. According to one embodiment, switch 24 may be located at a baseboard. Switch 24 may have one or more ports 32, and programmable device 28 may have one or more queues 36. A port 32 represents a physical interface for a device through which packets may enter or exit the device. In the illustrated embodiment, switch 24 has ports $X_1$ and $X_2$. Port $X_1$ communicates with processor X, and port $X_2$ communicates programmable device 28.

Queues 36 store packets until the packets may be transmitted elsewhere. Queues 36 may represent temporary memory such as buffers. In the illustrated embodiment, switch 24 has queue X that stores packets from processor X until programmable device 28 is available to accept the packets.

Programmable device 28 facilitates communication of packets between processor X and processors $Y_i$ by transmitting packets between switch 24 and processors $Y_i$. According to one embodiment, programmable device 28 may represent a programmable semiconductor device such as a field programmable gate array (FPGA) located at a daughter card of a baseboard card of switch 24.

In the illustrated embodiment, programmable device 28 includes port Y and queues $Y_i$, where i=1, 2, 3. Port Y receives packets from switch 24. The packets may then be sorted according to their destination processor $Y_i$. Queue $Y_i$ receives and buffers packets for processor $Y_i$.

Congestion monitor 40 monitors the packets at queues $Y_i$. If a queue $Y_i$ is congested, congestion monitor 40 notifies processor X that processor $Y_i$ is congested. In one embodiment, congestion monitor 40 may monitor congestion by establishing a time-averaged occupancy for queues $Y_i$. If the time-averaged occupancy exceeds a time-averaged occupancy threshold, congestion monitor 40 may provide the notification. An example of congestion monitor 40 is described in more detail below with reference to FIG. 2.

In one embodiment, the time-averaged occupancy may refer to the average of the number of times the number of packets at a queue exceeds a predetermined threshold for the queue. In the embodiment, congestion monitor 40 may monitor a queue for an excess packets event that occurs when the number of packets exceeds a number of packets threshold. Congestion monitor 40 may count the number of times an excess packets event occurs. If the frequency of these excess packets events exceeds a frequency threshold, congestion monitor 40 may notify processor X.

A component of system 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated. Moreover, the operations of system 10 may be performed by more, fewer, or other components. For example, the operations of congestion monitor 40 may be performed by more than one component. Additionally, operations of system 10 may be performed using any suitable logic. As used in this document, "each" refers to each member of a set or each member of a subset of a set.

FIG. 2 illustrates embodiments of switch 24 and programmable device 28 that may be used by system 10 of FIG. 1. In the illustrated embodiment, a baseboard 42 includes processor X and switch 24 with queue X. A daughter card 46 includes a receiver 50, a transmitter 54, programmable device 28, and processors $Y_i$, where i=1, 2, 3. Programmable device 28 includes queues $Y_i$, where i=1, 2, 3, and congestion monitor 40.

In one embodiment, receiver 50 receives packets from switch card 24. Receiver 50 may sort packets to send packets for processor $Y_i$ to queue $Y_i$. The packets may be sorted using the destination address in the header of the packets. Transmitter 54 transmits packets to switch 24.

Congestion monitor 40 monitors the packets at queues $Y_i$. If a queue $Y_i$ is congested, congestion monitor 40 notifies processor X that processor $Y_i$ is congested. In one embodiment, congestion monitor 40 may monitor congestion by establishing a time-averaged occupancy for queues $Y_i$. If the time-averaged occupancy exceeds a time-averaged occupancy threshold, congestion monitor 40 may provide the notification. In one embodiment, congestion monitor 40 may monitor a queue for an excess packets event that occurs when the number of packets exceeds a number of packets threshold. If the frequency of excess packets events exceeds a frequency threshold, congestion monitor 40 may notify processor X.

Congestion monitor 40 may include any suitable components to monitor the packets at queues $Y_i$. According to the illustrated embodiment, congestion monitor 40 may have monitors 41a-c for each queue $Y_i$. A monitor 41 may include a counting timer 60, counting logic 62, a counter 64, a reset timer 68, and a comparator 74.

Counting timer 60 provides counter timer indicators that indicate when packets at a queue $Y_i$ should be measured to establish whether an excess packets event has occurred. Counting timer 60 may be set to any suitable time interval at which counter timer indicators are provided. The time interval may be sufficiently short to collect enough measurements to provide an accurate estimate of the frequency of excess packets events, but may be sufficiently long to avoid wasting resources by collecting too many measurements. Examples of settings for counting timer 60 include less than 50, 40, or 25 microseconds, such as approximately 10 microseconds.

Counting logic 62 measures the packets at a queue $Y_i$ to establish whether an excess packets event has occurred. That is, counting logic 62 determines whether the number of packets in queue $Y_i$ has exceeded a number of packets threshold 58. Counting logic 62 may measure to packets in response to receiving a counter timer indicator from counting timer 60.

Number of packets threshold 58 may have any suitable value. The value may be less than the number of packets that queue $Y_i$ can buffer, and may be selected according to the processing speed of processor $Y_i$. The value may be sufficiently small to provide adequate notification of congestion at processor $Y_i$, but may be sufficiently large to allow queue $Y_i$ to buffer more packets. Number of packets threshold 58 may be the same or different for the different queues $Y_i$.

If counting logic 62 determines that an excess packets event has occurred, counting logic 62 updates counter 64. Counter 64 tracks the number of excess packets events that have occurred during a predetermined period, which may be set by reset timer 68.

Reset timer 68 provides reset indicators to counter 64, which sends the number of excess packets events to comparator 72 in response to receiving a reset indicator. Counter 64 may also reset to an initial value, for example, zero, in response to receiving a reset indicator.

Reset timer 68 may provide reset indicators at any suitable time interval. A shorter time interval may provide more accurate and more updated notifications to processor X, but a longer time interval may tend to use less resources. The time interval for reset timer 68 may have any suitable value, for example, a value equal to or larger than the time interval value for counting timer 60. Examples of reset timer time intervals include great than 50, 100, or 200 microseconds, for example, approximately 1 millisecond.

Comparator 72 compares the frequency of excess packets events with a frequency threshold 70, and notifies processor X if the frequency exceeds the threshold. Frequency threshold 70 indicates the level at which processor X should be notified. Frequency threshold 70 may have any suitable value, and may have a lower value for more frequent notification or a higher value for less frequent notification.

The notification may be provided in any suitable manner. For example, the notification may be provided via an interrupt that is routed from programmable device 28 to processor X. As another example, the notification may be provided by sending a pre-programmed notification packet. The notification may identify which processor $Y_i$ is congested.

In one embodiment, processor X may be operable to prioritize the flow of packets, for example, slow the flow of packets to the identified processor $Y_i$ and/or buffer packets. The prioritization may reduce or prevent congestion and/or head-of-line blocking problems.

Values of number of packets threshold 58, frequency threshold 70, counting timer interval, and/or reset timer interval may be selected to manage congestion at processors $Y_i$. For example, congestion prevention may prevent congestion before congestion occurs, and congestion control may reduce the effect of congestion after it occurs.

Modifications, additions, or omissions may be made to congestion monitor 40 without departing from the scope of the invention. The components of congestion monitor 40 may be integrated or separated. Moreover, the operations of congestion monitor 40 may be performed by more, fewer, or other components. For example, the operations of counting timer 60 and reset timer 68 may be performed by one component, or the operations of counting logic 62 may be performed by more than one component. Additionally, operations of congestion monitor 40 may be performed using any suitable logic.

FIG. 3 illustrates one embodiment of a method for monitoring congestion at a plurality of processors that may be used by system 10 of FIG. 1. The method begins at step 110, where processor X sends packets to switch 24. Switch 24 sends the packets to programmable device 28 at step 112.

Queues $Y_i$ receive the packets at step 114. Counting timer 60 may provide a counting timer indicator at step 118. If no counting timer indicator is provided, the method returns to step 114, where queues $Y_i$ continue to receive packets. If a counting timer indicator is provided, the method proceeds to step 122.

Counting logic 62 measures the number of packet in queues $Y_i$ at step 122. The number of packets in the queues $Y_i$ may exceed number of packets threshold 58 at step 126, indicating that an excess packets event has occurred. If threshold 58 has been exceeded, the method proceeds to step 130, where counter 64 is incremented. The method then proceeds to step 134. If threshold 58 has not been exceeded, the method proceeds directly to step 134.

Reset timer 68 may provide a reset timer indicator at step 134. If no reset timer indicator is provided, the method returns to step 114, where queues $Y_i$ continue to receive packets. If a reset timer indicator is provided, the method proceeds to step 138.

Comparators 72 compare the frequency of excess packet occurrences with a frequency threshold 70 at step 138. The frequency may exceed threshold 70 at step 142. If threshold 70 has been exceeded, congestion monitor 40 notifies processor X at step 146. Congestion monitor 40 may notify processor X that a particular processor $Y_i$ is congested. The method then proceeds to step 150. If threshold 70 has not been exceeded, the method proceeds directly to step 150.

Counter 64 is reset at step 150. Programmable device 28 may receive more packets are step 154. If there are more packets, the method returns to step 114, where queues $Y_i$ receive the packets. If there are no more packets, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a congestion monitor may monitor congestion at a number of processors, and may provide a notification if a processor becomes congested. In the embodiment, the congestion monitor may monitor congestion by establishing a time-averaged occupancy for queues buffering packets for the processors. If the time-averaged occupancy exceeds a time-averaged occupancy threshold, the congestion monitor may provide the notification.

Another technical advantage of one embodiment may be that the time-averaged occupancy may take into account whether the number of packets in a queue exceeds a predetermined threshold. In the embodiment, the congestion monitor determines the frequency of excess packets events at a queue, where an excess packets event occurs when the number of packets exceeds a number of packets threshold. The congestion monitor then determines whether the frequency of excess packets events exceeds a frequency threshold.

Another technical advantage of one embodiment may be that the congestion monitor may be provided at a programmable device separate from the switch. Accordingly, the switch need not be redesigned and/or upgraded. Another technical advantage of one embodiment may be that the different threshold values may be adjusted to achieve a desired amount of congestion control and/or congestion prevention.

Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the spirit and scope of this disclosure, as defined by the following claims.

What is claimed is:

1. A method for monitoring congestion at a plurality of processors, comprising:
   receiving a plurality of packets at a plurality of queues configured to input the packets to the plurality of processors, each queue associated with a processor external to the each queue and distinct from the processor of each other queue, the plurality of queues receiving the packets from the same port; and
   performing the following for each queue of the plurality of queues:
      establishing whether a time-averaged occupancy of the each queue exceeds a time-averaged occupancy threshold by:
         determining a first time interval and a second time interval, the first time interval and the second time interval set to avoid hardware head-of-line blocking;
         detecting the start of the first time interval;
         performing the following for each counter timer indicator of a plurality of counter timer indicators, the counter timer indicator indicating that the second time interval has elapsed:
            establishing whether there is an excess packets event in response to the each counter timer indicator, an excess packets event occurring when a number of packets at the each queue exceeds a number of packets threshold; and
            incrementing an excess packets event counter if there is an excess packets event;
         determining a frequency of excess packet events;
         detecting an end of the first time interval; and
         establishing whether the frequency of excess packet events during the time interval exceeds a frequency threshold; and
      providing a notification if the time-averaged occupancy of the each queue exceeds the time-averaged occupancy threshold, the notification provided by a congestion monitor associated with the each queue in order to inform a sender processor to prioritize the packets to reduce head-of-line blocking.

2. The method of claim 1, wherein establishing whether the time-averaged occupancy of the each queue exceeds the time-averaged occupancy threshold further comprises:
   establishing whether a frequency of excess packets events exceeds a frequency threshold, an excess packets event occurring when a number of packets at the each queue exceeds a number of packets threshold.

3. The method of claim 1, wherein establishing whether the time-averaged occupancy of the each queue exceeds the time-averaged occupancy threshold further comprises:
   performing the following for a specified number of iterations:
      establishing whether there is an excess packets event, an excess packets event occurring when a number of packets at the each queue exceeds a number of packets threshold; and
      counting the number of excess packets events to establish a frequency of excess packets events.

4. The method of claim 1, wherein establishing whether the time-averaged occupancy of the each queue exceeds the time-averaged occupancy threshold further comprises:
   performing the following for each counter timer indicator of a plurality of counter timer indicators:
      establishing whether there is an excess packets event in response to the each counter timer indicator, an excess packets event occurring when a number of packets at the each queue exceeds a number of packets threshold; and
      incrementing an excess packets event counter if there is an excess packets event.

5. The method of claim 1, wherein receiving the plurality of packets at the plurality of queues further comprises:
   receiving the plurality of packets from a sender processor through a switch.

6. The method of claim 1, wherein providing the notification if the time-averaged occupancy of the each queue exceeds the time-averaged occupancy threshold further comprises:
   providing the notification to a sender processor, the notification identifying the processor associated with the each queue, the sender processor operable to adjust a flow of packets to the identified processor in response to the notification.

7. A system for monitoring congestion at a plurality of processors, comprising:
   a plurality of queues operable to receive a plurality of packets and input the packets to the plurality of processors, each queue associated with a processor external to the each queue and distinct from the processor of each other queue, the plurality of queues operable to receive the packets from the same port; and
   a congestion monitor coupled to the plurality of queues and operable to perform the following for each queue of the plurality of queues:
      establish whether a time-averaged occupancy of the each queue exceeds a time-averaged occupancy threshold by:
         determining a first time interval and a second time interval, the first time interval and the second time interval set to avoid hardware head-of-line blocking;
         detecting the start of the first time interval;
         performing the following for each counter timer indicator of a plurality of counter timer indicators, the counter timer indicator indicating that the second time interval has elapsed:
            establishing whether there is an excess packets event in response to the each counter timer indicator, an excess packets event occurring when a number of packets at the each queue exceeds a number of packets threshold; and
            incrementing an excess packets event counter if there is an excess packets event;
         determining a frequency of excess packet events;
         detecting an end of the first time interval; and
         establishing whether the frequency of excess packet events during the time interval exceeds a frequency threshold; and
      provide a notification if the time-averaged occupancy of the each queue exceeds the time-averaged occupancy threshold, the notification provided by a congestion monitor associated with the each queue in order to inform a sender processor indicating to prioritize the packets to reduce head-of-line blocking.

8. The system of claim 7, the congestion monitor further operable to establish whether the time-averaged occupancy of the each queue exceeds the time-averaged occupancy threshold by:

establishing whether a frequency of excess packets events exceeds a frequency threshold, an excess packets event occurring when a number of packets at the each queue exceeds a number of packets threshold.

9. The system of claim 7, the congestion monitor further operable to establish whether the time-averaged occupancy of the each queue exceeds the time-averaged occupancy threshold by:
performing the following for a specified number of iterations:
establishing whether there is an excess packets event, an excess packets event occurring when a number of packets at the each queue exceeds a number of packets threshold; and
counting the number of excess packets events to establish a frequency of excess packets events.

10. The system of claim 7, the congestion monitor further operable to establish whether the time-averaged occupancy of the each queue exceeds the time-averaged occupancy threshold by:
performing the following for each counter timer indicator of a plurality of counter timer indicators:
establishing whether there is an excess packets event in response to the each counter timer indicator, an excess packets event occurring when a number of packets at the each queue exceeds a number of packets threshold; and
incrementing an excess packets event counter if there is an excess packets event.

11. The system of claim 7, the plurality of queues further operable to receive the plurality of packets at the plurality of queues by:
receiving the plurality of packets from a sender processor through a switch.

12. The system of claim 7, the congestion monitor further operable to provide the notification if the time-averaged occupancy of the each queue exceeds the time-averaged occupancy threshold by:
providing the notification to a sender processor, the notification identifying the processor associated with the each queue, the sender processor operable to adjust a flow of packets to the identified processor in response to the notification.

13. A non-transitory computer-readable storage media storing logic for monitoring congestion at a plurality of processors, the logic comprising software encoded in the computer-readable storage media and executable to:
receive a plurality of packets at a plurality of queues configured to input the packets to the plurality of processors, each queue associated with a processor external to the each queue and distinct from the processor of each other queue, the plurality of queues receiving the packets from the same port; and
perform the following for each queue of the plurality of queues:
establish whether a time-averaged occupancy of the each queue exceeds a time-averaged occupancy threshold by:
determining a first time interval and a second time interval, the first time interval and the second time interval set to avoid hardware head-of-line blocking;
detecting the start of the first time interval;
performing the following for each counter timer indicator of a plurality of counter timer indicators, the counter timer indicator indicating that the second time interval has elapsed:
establishing whether there is an excess packets event in response to the each counter timer indicator, an excess packets event occurring when a number of packets at the each queue exceeds a number of packets threshold; and
incrementing an excess packets event counter if there is an excess packets event;
determining a frequency of excess packet events;
detecting an end of the first time interval; and
establishing whether the frequency of excess packet events during the time interval exceeds a frequency threshold; and
provide a notification if the time-averaged occupancy of the each queue exceeds the time-averaged occupancy threshold, the notification provided by a congestion monitor associated with the each queue in order to inform a sender processor to prioritize the packets to reduce head-of-line blocking.

14. The computer-readable storage media of claim 13, further operable to establish whether the time-averaged occupancy of the each queue exceeds the time-averaged occupancy threshold by:
establishing whether a frequency of excess packets events exceeds a frequency threshold, an excess packets event occurring when a number of packets at the each queue exceeds a number of packets threshold.

15. The computer-readable storage media of claim 13, further operable to establish whether the time-averaged occupancy of the each queue exceeds the time-averaged occupancy threshold by:
performing the following for a specified number of iterations:
establishing whether there is an excess packets event, an excess packets event occurring when a number of packets at the each queue exceeds a number of packets threshold; and
counting the number of excess packets events to establish a frequency of excess packets events.

16. The computer-readable storage media of claim 13, further operable to establish whether the time-averaged occupancy of the each queue exceeds the time-averaged occupancy threshold by:
performing the following for each counter timer indicator of a plurality of counter timer indicators:
establishing whether there is an excess packets event in response to the each counter timer indicator, an excess packets event occurring when a number of packets at the each queue exceeds a number of packets threshold; and
incrementing an excess packets event counter if there is an excess packets event.

17. The computer-readable storage media of claim 13, further operable to receive the plurality of packets at the plurality of queues by:
receiving the plurality of packets from a sender processor through a switch.

18. The computer-readable storage media of claim 13, further operable to provide the notification if the time-averaged occupancy of the each queue exceeds the time-averaged occupancy threshold by:
providing the notification to a sender processor, the notification identifying the processor associated with the each queue, the sender processor operable to adjust a flow of packets to the identified processor in response to the notification.

19. A system for monitoring congestion at a plurality of processors, comprising:

means for receiving a plurality of packets at a plurality of queues configured to input the packets to the plurality of processors, each queue associated with a processor external to the each queue and distinct from the processor of each other queue, the plurality of queues receiving the packets from the same port; and means for performing the following for each queue of the plurality of queues:

establishing whether a time-averaged occupancy of the each queue exceeds a time-averaged occupancy threshold by:

determining a first time interval and a second time interval, the first time interval and the second time interval set to avoid hardware head-of-line blocking;

detecting the start of the first time interval;

performing the following for each counter timer indicator of a plurality of counter timer indicators, the counter timer indicator indicating that the second time interval has elapsed:

establishing whether there is an excess packets event in response to the each counter timer indicator, an excess packets event occurring when a number of packets at the each queue exceeds a number of packets threshold; and incrementing an excess packets event counter if there is an excess packets event;

determining a frequency of excess packet events;

detecting an end of the first time interval; and establishing whether the frequency of excess packet events during the time interval exceeds a frequency threshold; and providing a notification if the time-averaged occupancy of the each queue exceeds the time-averaged occupancy threshold, the notification provided by a congestion monitor associated with the each queue in order to inform a sender processor to prioritize the packets to reduce head-of-line blocking.

20. A system for monitoring congestion at a plurality of processors, comprising:

a plurality of queues operable to receive a plurality of packets and input the packets to the plurality of processors, each queue associated with a processor external to the each queue and distinct from the processor of each other queue, the plurality of packets received from a sender processor through a switch, the plurality of queues operable to receive the packets from the same port; and a congestion monitor coupled to the plurality of queues and operable to perform the following for each queue of the plurality of queues:

establish whether a time-averaged occupancy of the each queue exceeds a time-averaged occupancy threshold by:

determining a first time interval and a second time interval, the first time interval and the second time interval set to avoid hardware head-of-line blocking;

detecting the start of the first time interval;

performing the following for each counter timer indicator of a plurality of counter timer indicators, the counter timer indicator indicating that the second time interval has elapsed:

establishing whether there is an excess packets event in response to the each counter timer indicator, an excess packets event occurring when a number of packets at the each queue exceeds a number of packets threshold; and incrementing an excess packets event counter if there is an excess packets event;

determining a frequency of excess packet events;

detecting an end of the first time interval; and establishing whether the frequency of excess packet events during the time interval exceeds a frequency threshold;

performing the following for each counter timer indicator of a plurality of counter timer indicators:

establishing whether there is an excess packets event in response to the each counter timer indicator, an excess packets event occurring when a number of packets at the each queue exceeds a number of packets threshold; and incrementing an excess packets event counter if there is an excess packets event; and provide a notification if the time-averaged occupancy of the each queue exceeds the time-averaged occupancy threshold by:

providing the notification from a congestion monitor associated with the each queue to the sender processor, the notification identifying the processor associated with the each queue, the sender processor operable to adjust a flow of packets to the identified processor in response to the notification, the notification indicating to prioritize the packets to reduce head-of-line blocking at the port by holding packets destined for the affected external processor until the affected external processor becomes available and by continuing sending packets destined for the other external processors.

* * * * *